United States Patent
Yamashita

(10) Patent No.: US 9,313,355 B2
(45) Date of Patent: Apr. 12, 2016

(54) ACTIVATION PROCESSING OF INFORMATION PROCESSING APPARATUS, METHOD OF CONTROLLING THE SAME, AND STORAGE MEDIUM

(71) Applicant: CANON KABUSHIKI KAISHA, Tokyo (JP)

(72) Inventor: Takahiro Yamashita, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/068,021

(22) Filed: Oct. 31, 2013

(65) Prior Publication Data

US 2014/0132973 A1    May 15, 2014

(30) Foreign Application Priority Data

Nov. 13, 2012 (JP) ................................. 2012-249646

(51) Int. Cl.
*G06F 3/12* (2006.01)
*H04N 1/00* (2006.01)
*H04N 1/333* (2006.01)

(52) U.S. Cl.
CPC ........ *H04N 1/00928* (2013.01); *H04N 1/00209* (2013.01); *H04N 2201/0074* (2013.01); *H04N 2201/0094* (2013.01)

(58) Field of Classification Search
CPC ....... G06F 3/12; G06F 3/1278; G06F 3/1203; G06F 3/1204; G06F 3/1294; G06F 1/3215; G06F 1/3265; B06F 1/3203
USPC ............... 358/1.1, 1.9, 1.13, 1.14, 1.15, 1.18; 399/13, 75; 713/300, 310, 324; 348/372
See application file for complete search history.

(56) References Cited

U.S. PATENT DOCUMENTS

| | | | |
|---|---|---|---|
| 6,993,670 B2 * | 1/2006 | Weng et al. | 713/323 |
| 8,612,783 B2 * | 12/2013 | Shih et al. | 713/310 |
| 8,692,905 B2 * | 4/2014 | Ikeda et al. | 348/231.99 |
| 2007/0086451 A1 * | 4/2007 | Sato et al. | 370/389 |
| 2009/0296127 A1 * | 12/2009 | Kasamatsu | 358/1.13 |
| 2012/0173898 A1 | 7/2012 | Shih et al. | |
| 2013/0120781 A1 * | 5/2013 | Iwashima | 358/1.13 |

FOREIGN PATENT DOCUMENTS

JP    2012-018447 A    1/2012

OTHER PUBLICATIONS

Office Action issued in corresponding German Patent Application No. 102013223008.7, dated Nov. 24, 2014. English translation provided.

* cited by examiner

*Primary Examiner* — Gabriel Garcia
(74) *Attorney, Agent, or Firm* — Rossi, Kimms & McDowell LLP

(57) ABSTRACT

An information processing apparatus activatable by first activation processing or by second activation processing, and method for controlling activation of the apparatus. When the information processing apparatus detects a request for causing it to activate by second activation processing upon the activation, it activates by the second activation processing when it is caused to activate due to a switch. The information processing apparatus activates by a first activation processing when it is caused to activate due to a received instruction.

12 Claims, 7 Drawing Sheets

ACTIVATION PROCESSING OF INFORMATION PROCESSING APPARATUS, METHOD OF CONTROLLING THE SAME, AND STORAGE MEDIUM

BACKGROUND OF THE INVENTION

1. Field of the Invention

The present invention relates to an information processing apparatus, a method of controlling the same and a storage medium.

2. Description of the Related Art

Recently it has become standard that image forming apparatuses are equipped with a function for connecting to a network. On image forming apparatuses capable of connecting to networks, various data processing can be executed, data or commands being received from an information processing apparatus such as a personal computer via a network and processed. One example of technology that took advantage of this is a remote activation technique in which activation processing of an image forming apparatus is initiated when the image forming apparatus receives an activation request from a user via a network.

Meanwhile, a technique exists in which at activation time, a particular external input is detected, and in accordance with the detected input, an activation mode or initialization processing is switched. For example, there is a technique in which, when an operation in which operation keys are pressed in a predetermined order, or when insertion of a USB device is detected, activation in a maintenance mode or setting can be performed.

Japanese Patent Laid-Open No. 2012-18447 discloses a remote activation control technique of a management target server that is managed by a management server. Specifically, when the management target server initiates activation processing upon an activation request from the network, the management server, having detected the activation processing, performs activation control of the management target server by transmitting information for the activation processing to the management target server.

However, with the above described conventional techniques, there exists a problem that, when an apparatus detects an external input upon remote activation, regardless of the will of a user, transition is made into a special activation mode such as the maintenance mode, based on the content of the external input.

Also, with the technique recited in Japanese Patent Laid-Open No. 2012-18447, a management server for performing control of remote activation of the management target server is necessary. Further, there exists a problem that because activation control of the management target server is performed in accordance with a setting value set in the management server, activation control cannot be performed according to a status of the management target server (such as a hardware connection status).

SUMMARY OF THE INVENTION

An aspect of the present invention is to eliminate the above-mentioned problems with the conventional techniques.

A feature of the present invention is to provide a technique in which it is possible to inhibit transition into a state that a user does not desire transition into in an activation due to an activation request from the network.

According to an aspect of the present invention, there is provided an information processing apparatus activatable by first activation processing or by second activation processing. The apparatus comprises a switch configured to cause the information processing apparatus to activate, a reception unit configured to receive, from an external apparatus, an instruction for causing the information processing apparatus to activate, a detection unit configured to detect a request for causing the information processing apparatus to activate by the second activation processing and a control unit configured to, in a case where the information processing apparatus activates and the detection unit detects the request, cause the information processing apparatus to activate by the second activation processing in a case where the information processing apparatus is caused to activate by the switch, and cause the information processing apparatus to activate by the first activation processing in a case where the information processing apparatus is caused to activate by an instruction received by the reception unit.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Embodiments of the present invention will be described hereinafter in detail, with reference to the accompanying drawings. It is to be understood that the following embodiments are not intended to limit the scope of the claims of the present invention, and that not all of the combinations of the aspects that are described according to the following embodiments are necessarily required with respect to the means to solve the problems according to the present invention.

Figure 1:
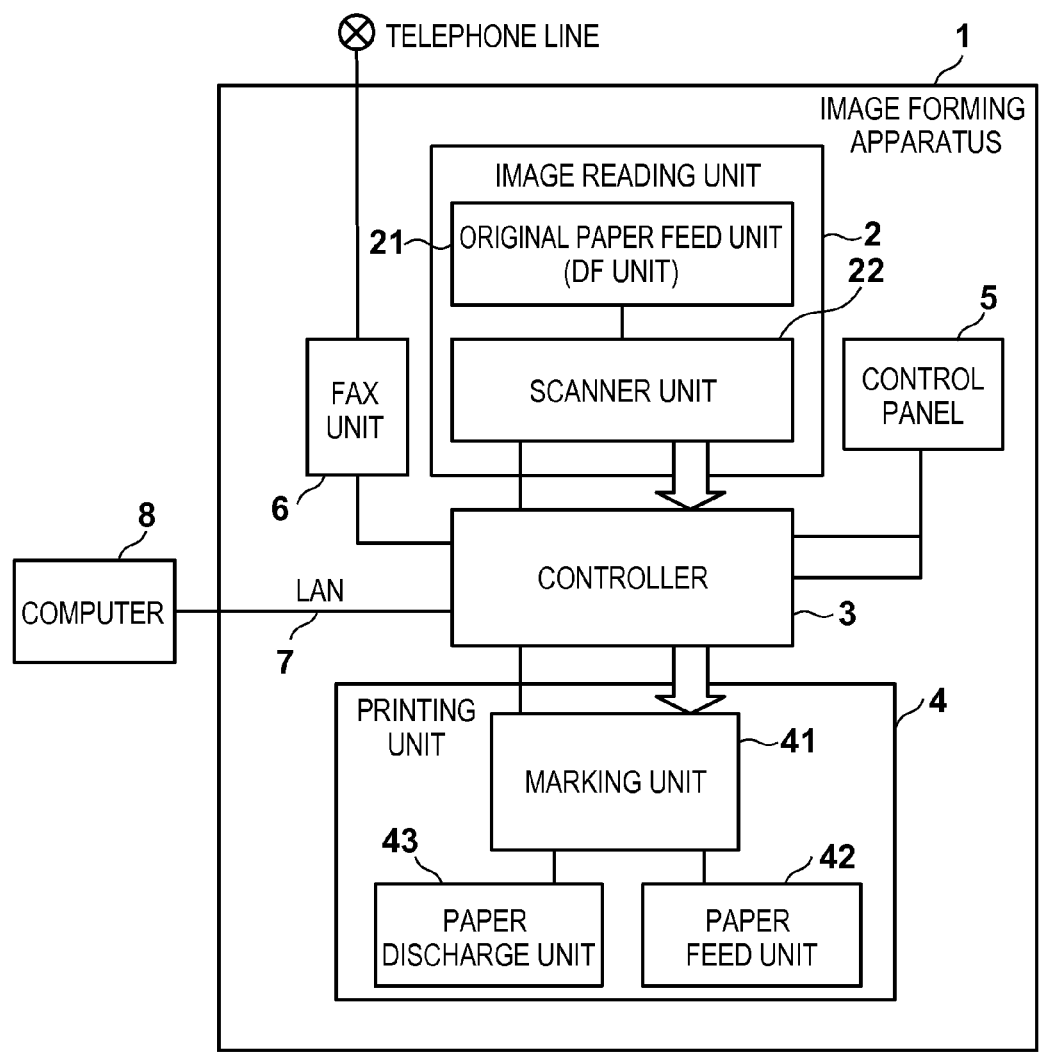
FIG. 1 is a block diagram for illustrating a configuration of an image forming apparatus (multi function peripheral) which is one example of an information processing apparatus according to an embodiment of the present invention.

FIG. 1 is a block diagram for illustrating a configuration of an image forming apparatus 1 (multi function peripheral) which is one example of an information processing apparatus according to an embodiment of the present invention. Note, in this embodiment, explanation will be given with the example of a multi function peripheral (multi function device) having a printer function, a scanner function, a facsimile function and a storage function as the image forming apparatus. However, the information processing apparatus of the present invention is not limited to this, and, for example, can be adapted to be an information processing apparatus such as a PC, a game console, or various kinds of mobile devices.

The image forming apparatus 1 optically scans an original and comprises an image reading unit 2 that generates image data corresponding to an image on the original, a printing unit 4 that prints an image onto a sheet based on the image data, and a control panel 5 that is operated by a user and acts as an user interface. Furthermore, the image forming apparatus 1 comprises a FAX unit 6 that transmits and receives facsimile signals via a telephone line, and a controller 3 that is connected to each unit and controls operation of the image forming apparatus on the whole. Also, the image forming apparatus 1 can perform input and output of various instructions, and the like, dispatch of jobs and transmission and receipt of such things as image data with a computer 8 via a LAN 7.

The image reading unit 2 comprises a original paper feed unit 21 that loads an original pile and automatically conveys originals one at a time, and a scanner unit 22 that generates a digital image by scanning a conveyed original optically, and also transmits image data so generated to the controller 3.

The printing unit 4 loads a plurality of sheets, and comprises a paper feed unit 42 that feeds sheets one at a time, a marking unit 41 that prints image data onto a sheet, and a paper discharge unit 43 that discharges the printed sheet after printing.

Next, explanation will be given for examples of functions of the image forming apparatus 1.

Copy Function

Storing image data generated by the image reading unit 2 into a non-volatile memory unit (FIG. 2, HDD 102) of the controller 3 and also printing with the printing unit 4 based on this image data.

Image Transmission Function

Transmitting image data generated by the image reading unit 2 to the computer 8 via the LAN 7.

Image Saving Function

Storing image data generated by the image reading unit 2 into the non-volatile memory unit of the controller 3 (HDD 102 in FIG. 2) and transmitting or printing as necessary.

Image Printing Function

Analyzing a page definition language, for example, received from the computer 8 via the LAN 7, and printing with the printing unit 4.

Figure 2:
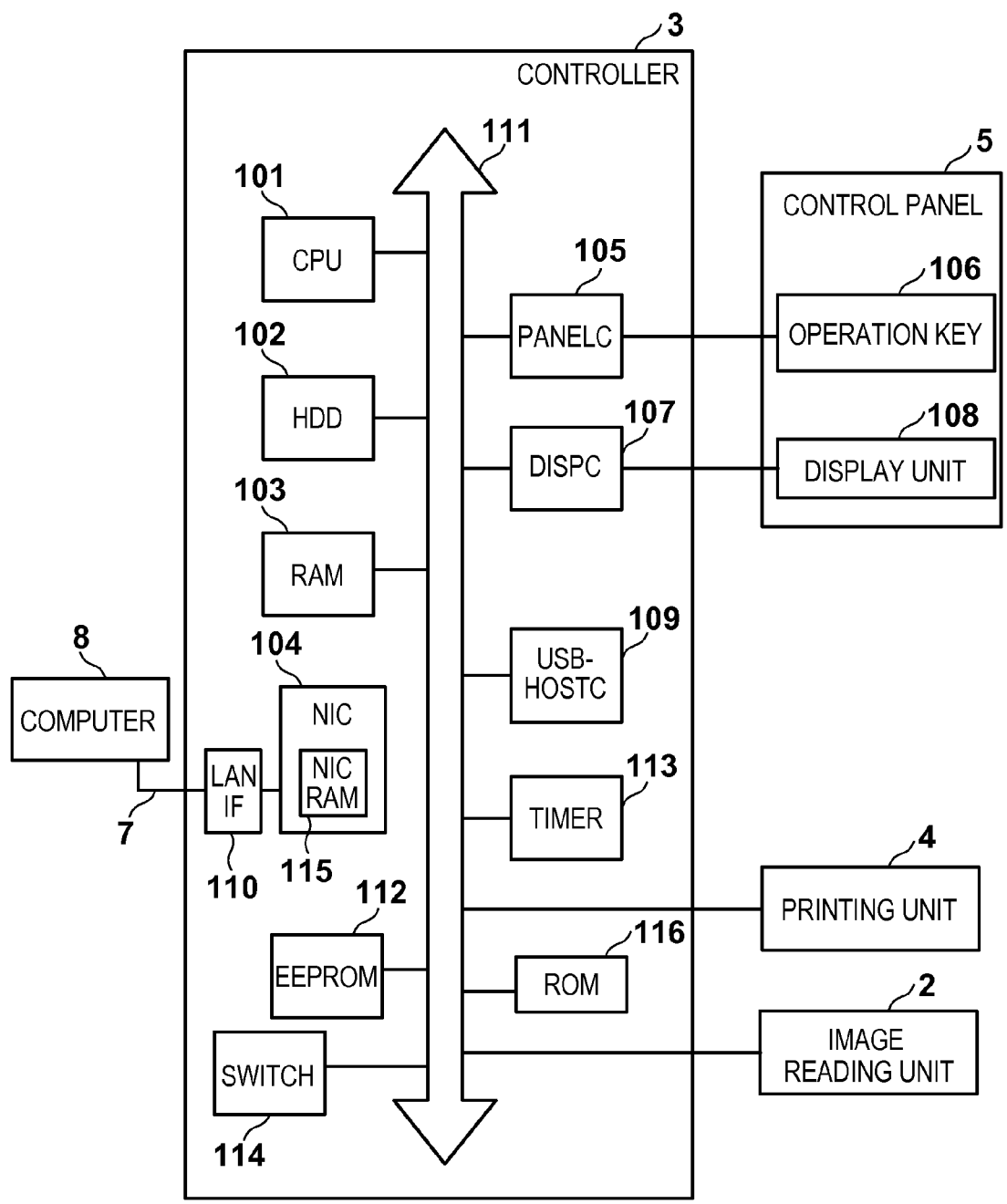
FIG. 2 is a block diagram for illustrating a configuration of a controller of the image forming apparatus according to the embodiment.

FIG. 2 is a block diagram for illustrating a configuration of the controller 3 of the image forming apparatus 1 according to the embodiment.

In FIG. 2, a CPU 101 reads out a program installed in the HDD 102, loads the program into a RAM 103, and controls the operation of the image forming apparatus 1 by executing the loaded program. The HDD 102 is a hard disk drive, and stores various programs for giving commands to the CPU 101. Also, the HDD 102 saves data of such things as a boot loader for selecting an OS, an OS which is base software, firmware for realization and control of various functions, and a file system for efficiently managing files. The RAM 103 is used as a main memory or a work area of the CPU 101. A network interface card (NIC) 104 is connected to a LAN IF 110, and performs data exchange, communicating bidirectionally with other network devices or a computer 8 via the LAN 7.

The control panel 5 comprises a display unit 108 having a touch panel and an operation keys 106. A panel controller (PANELC) 105 detects instruction input from the touch panel or the operation keys 106, controls the control panel 5 and so on. A display controller (DISPC) 107 controls display to the display unit 108. A USB host controller (USB-HOSTC) 109 is connectable to a USB device comprising a USB interface such as a high capacity storage device or an IC card reader. An EEPROM 112 is a rewritable, low capacity non-volatile memory, and stores such things as setting information of the image forming apparatus 1. A timer 113 comprises a rechargeable battery and measures an elapsed time from a reference time, or measures an elapsed time in accordance with an instruction from the CPU 101, and so on.

A switch 114 dispatches an electric power control instruction to the CPU 101. Also, the NIC 104 can dispatch an electric power control instruction to the CPU 101 in accordance with the content of a network packet received via the LAN 7. With this, it is possible to perform activation processing of the image forming apparatus 1 from the computer 8. Also, because the NIC 104 performs reception processing and determination processing for remote activation request packets, even if the image forming apparatus 1 is in a shutdown state, it is necessary to supply electric power to the NIC 104. The CPU 101 performs activation processing, shutdown processing and transition processing for transition into a power saving state in accordance with the electric power control instruction. Also, the NIC 104 stores a 48 bit MAC address which is different for each NIC and is used in designating such things as a transmission destination of a later explained magic packet. The NIC 104 comprises a NIC RAM 115 and this NIC RAM 115 is used for purposes of saving a setting value of whether or not a remote activation was performed, saving a part of a packet, and so on. A ROM 116 stores such things as a boot program that the CPU 101 executes at activation time. A system bus 111 is a bus that connects the CPU 101 and the various above described units, and transmits data, address signals, control signals and the like.

Figure 3:
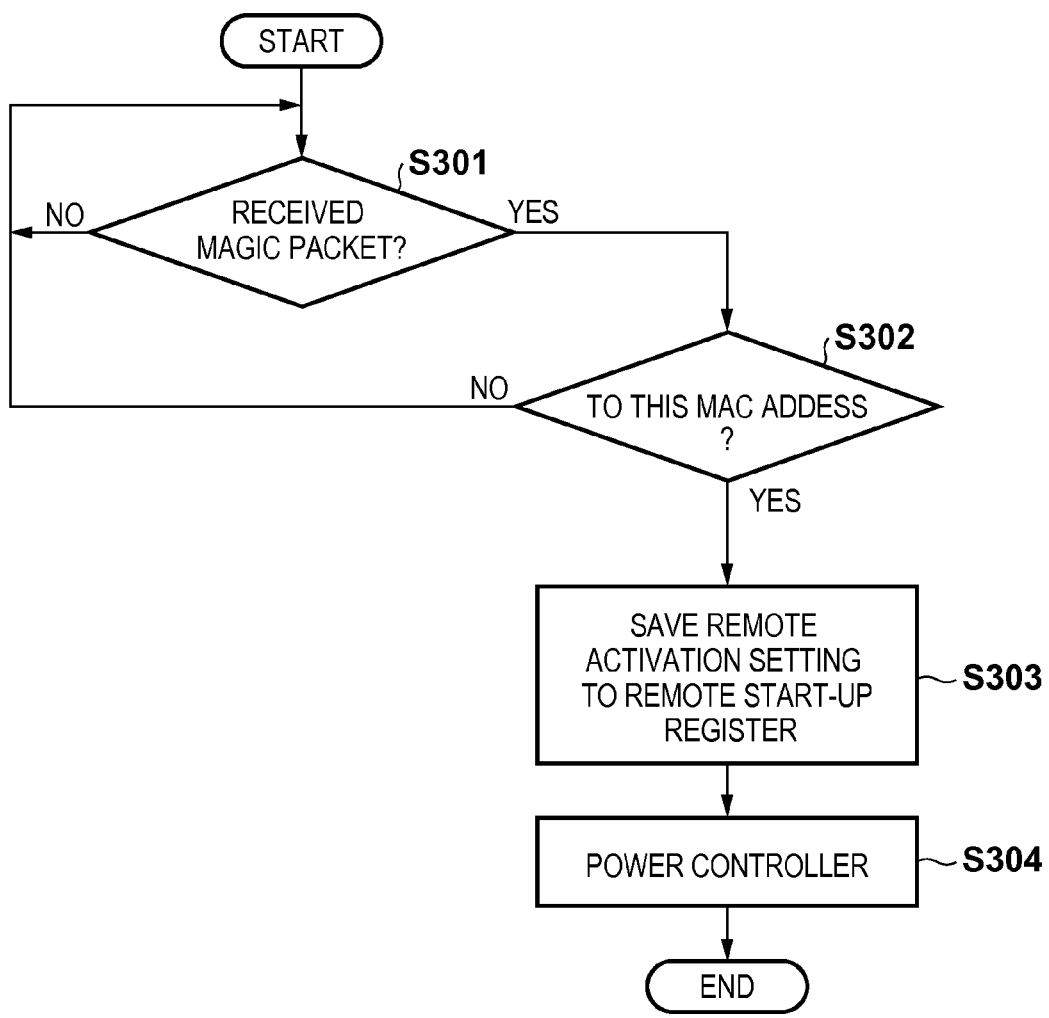
FIG. 3 is a flowchart for describing operation of a NIC when the image forming apparatus according to the embodiment is in a shutdown state.

FIG. 3 is a flowchart for describing operation of the NIC 104 when the image forming apparatus 1 according to the embodiment is in a shutdown state.

Firstly, in step S301, the NIC 104 is in a standby state waiting to receive predetermined information (specifically a magic packet). When, in step S301, the NIC 104 receives the magic packet, the processing proceeds to step S302 and the NIC 104 determines whether or not the received magic packet was transmitted to a MAC address of the image forming apparatus 1. The magic packet includes a MAC address of a network device that is a transmission target. For this reason, by comparing the MAC address of the magic packet with the MAC address of the image forming apparatus 1 stored in the NIC 104, it is possible to determine whether or not the magic packet is addressed to the image forming apparatus 1.

When the packet that the NIC 104 received in step S301 is not the magic packet, or when it is determined in step S302 that the magic packet is not addressed to the image forming apparatus 1, the received packet data is discarded and the processing proceeds to step S301. Then, in step S301, the NIC 104 once again enters the standby state waiting to receive the packet.

Meanwhile, when the packet that the NIC 104 received in step S302 is a magic packet addressed to the image forming apparatus 1, the processing proceeds to step S303 and the NIC 104 saves a valid value into a remote activation setting storage area of the NIC RAM 115 to indicate reception of a remote activation request. Then, the processing proceeds to step S304, and the NIC 104 controls so as to initiate an electric power supply to the controller 3 in order to activate the controller 3.

In this way, when the image forming apparatus 1 receives a magic packet addressed to the image forming apparatus 1 in the shutdown state, it is possible to automatically initiate activation processing.

Figure 4:
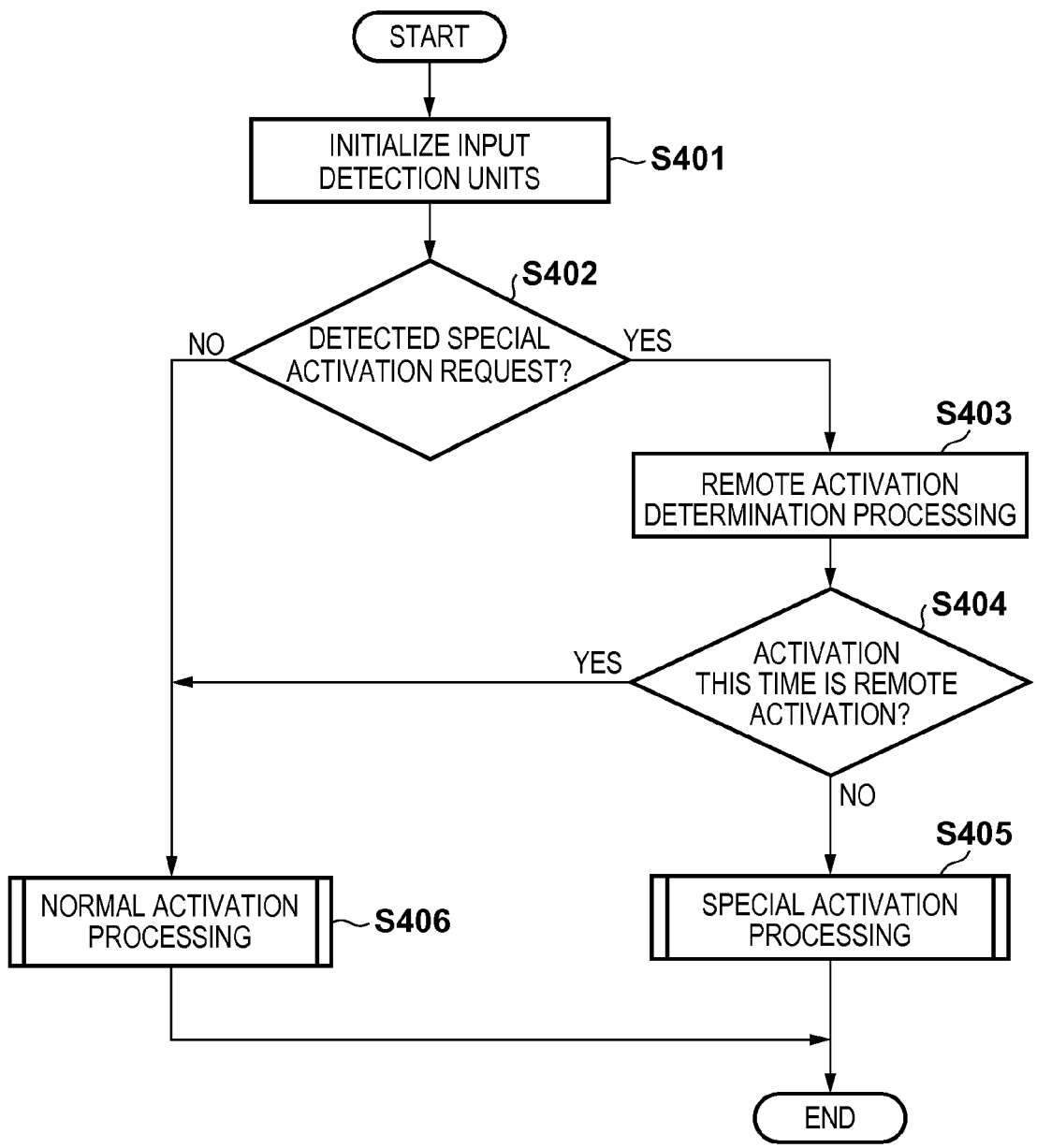
FIG. 4 is a flowchart for describing activation mode selection processing at an activation time in the image forming apparatus according to the embodiment.

FIG. 4 is a flowchart for describing activation mode selection processing at an activation time in the image forming apparatus 1 according to the embodiment. This processing is executed when the image forming apparatus 1 is activated by the remote activation as explained in FIG. 3 or by the user operating the switch 114. Also, in the following explanation, a case is explained in which the image forming apparatus 1 can selectively execute activation processing in a normal activation mode or in a special activation mode, two activation modes which are different from each other. Here, it is necessary to select the operating system, firmware and file system to use in accordance with the activation mode, for example. For this reason, it is necessary to perform activation mode selection processing at an initial stage in the activation processing. Note, this processing is performed by the CPU 101 executing a program stored in the ROM 116 with electric power supply to the controller 3 having been initiated.

Firstly, in step S401, the CPU 101 performs initialization of input detection units. Here, the input detection units correspond to the panel controller 105, the operation keys 106, the USB host controller 109 and the image reading unit 2. In step S401, the CPU 101 performs register setting on each of these input detection units. With this, it is possible for the CPU 101 to, for example, detect that the operation key 106 is pressed by the user.

Next, the processing proceeds to step S402, and the CPU 101 determines whether or not the special activation request has occurred for one of the input detection units. Based on this determination, the CPU 101 determines whether or not the activation mode will be the normal activation mode or the special activation mode. The special activation request occurs when one of the input detection units detects a specific operation by the user, and this special activation request is reported to the CPU 101. Examples of the specific operation include any one of such things as the user pressing the operation keys 106 in a predetermined order, the user inserting USB memory that stores maintenance data into the USB host controller 109, and a special activation flag being set, or the like. In step S402, the CPU 101 waits for a special activation request from the USB host controller 109 or an operation of the operation key 106 made by the user as previously described for a predetermined amount of time, and when, within that predetermined amount of time the special activation request occurs, the processing proceeds to step S403 and the CPU 101 performs remote activation determination processing.

On the other hand, when the CPU 101 determines, in step S402, that there is no special activation request within the predetermined amount of time, the processing proceeds to step S406 and normal activation processing (first activation processing) is performed. Also, when, in step S402, the CPU 101 detects the special activation request, the processing proceeds to step S403, and the CPU 101 acquires the remote activation setting value in order to determine whether or not the activation this time is due to the remote activation request. This is performed by the CPU 101 referencing a value of a remote activation setting area of the NIC RAM 115 (set in step S303 of FIG. 3). Note, the CPU 101, after acquiring the remote activation setting value from the NIC RAM 115, overwrites the setting value of the remote activation setting area of the NIC RAM 115 with a value indicating that remote activation has not been requested.

Next, the processing proceeds to step S404, and the CPU 101 determines whether or not the activation this time is a remote activation. When, in step S404, the CPU 101 determines that this time is not a remote activation, the processing proceeds to step S405, and the CPU 101 performs the special activation processing (second activation processing). Note, details of the special activation processing are later explained with reference to the flowchart of FIG. 7.

Meanwhile, when the CPU 101 does not detect the special activation request in step S402, or when, in step S404, the CPU 101 detects that the special activation request is the remote activation, the processing proceeds to step S406. In step S406, the CPU 101 performs the normal activation processing. Details of the normal activation processing will be later explained with reference to the flowchart of FIG. 6. With this, even when, for example, a user performs remote activation not knowing that a USB device for maintenance is inserted into the USB host controller 109, it is possible to prevent transitioning into the maintenance mode of the image forming apparatus 1 which is not what the user intended.

In the flowchart of FIG. 4, because when the image forming apparatus 1 activates due to the remote activation request, the image forming apparatus 1 does not perform the special activation processing, transition, which the user does not desire, to the special activation mode can be prevented for the remote activation request.

Figure 5:
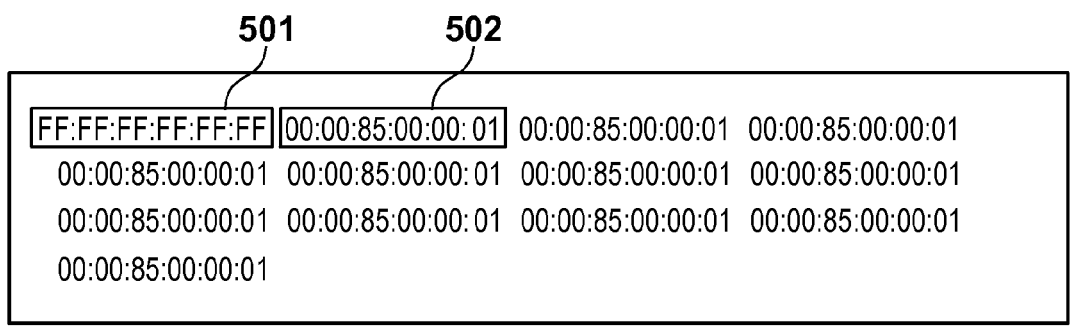
FIG. 5 is a view for explaining a magic packet which is one example of a remote activation request packet according to the embodiment.

FIG. 5 is a view for explaining a magic packet which is one example of a remote activation request packet according to the embodiment.

The magic packet is a packet in which somewhere in the payload after "FF:FF:FF:FF:FF:FF" 501, the MAC address 502 of the apparatus to be activated is repeated 16 times. FIG. 5 shows an example of a magic packet when the MAC address 502 is "00:00:85:00:00:01". Note, this example of a packet is only one example and other packets defined in other formats may alternatively be used.

Figure 6:
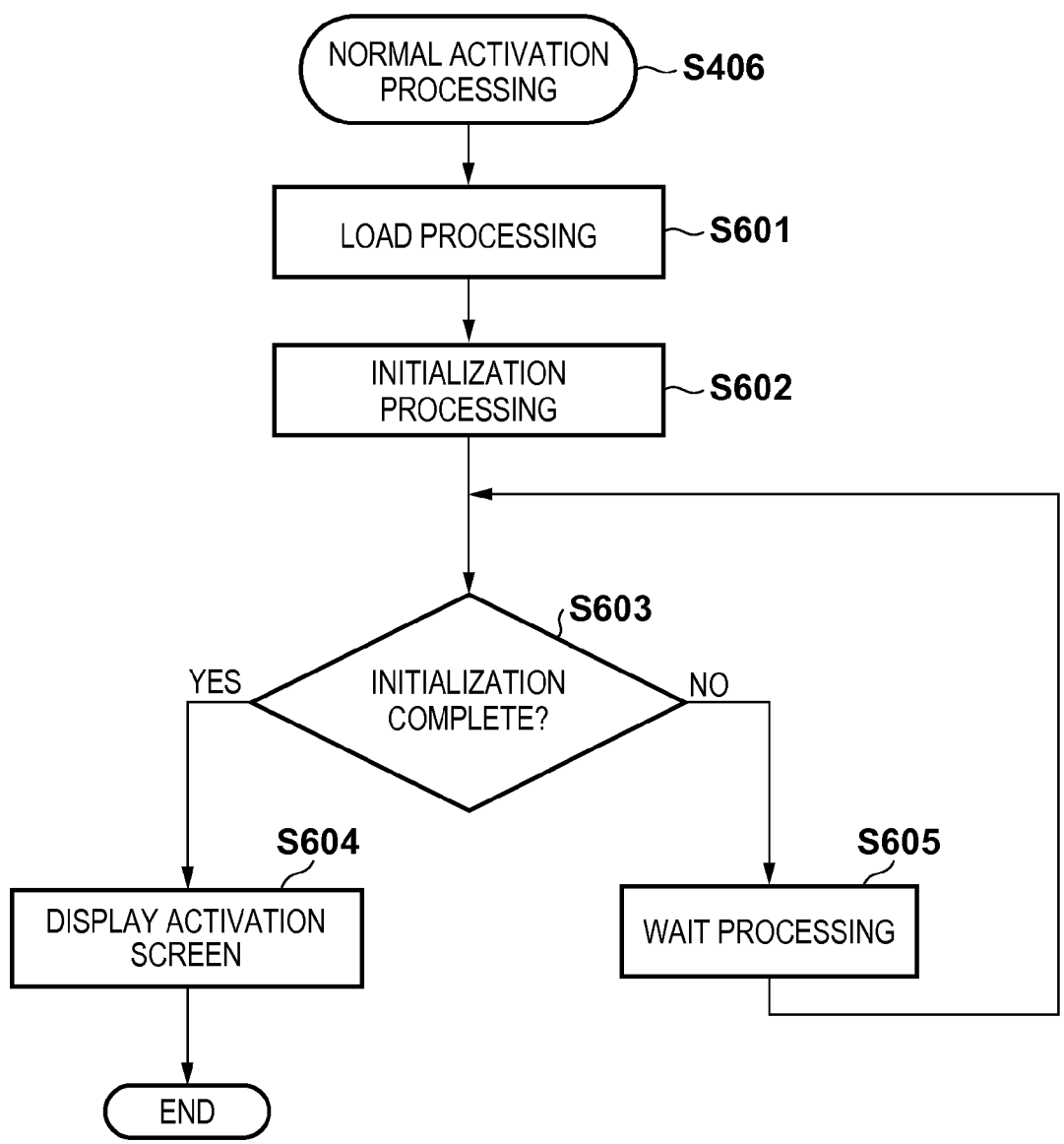
FIG. 6 is a flowchart for describing normal activation processing (step S406 of FIG. 4) by the image forming apparatus according to the embodiment.

FIG. 6 is a flowchart for describing the normal activation processing (step S406 of FIG. 4) by the image forming apparatus 1 according to the embodiment. Note, this processing is achieved by the CPU 101 executing a boot program stored in the ROM 116.

Firstly, in step S601, the CPU 101 loads the operating system and the firmware of the HDD 102 into the RAM 103. Next, the processing proceeds to step S602 and the CPU 101 performs initialization processing based on content of the firmware of the RAM 103 and a setting file saved in the file system of the HDD 102. Next, the processing proceeds to step S603, and the CPU 101 determines whether or not the initialization processing has completed and if the initialization processing has completed, the processing proceeds to step S604 and the CPU 101 displays a bitmap image of an activation menu on the display unit 108 of the control panel 5. On the other hand, when, in step S603, the initialization processing has not completed, the processing proceeds to step S605, a predetermined amount of time is waited, and after the predetermined amount of time, once again it is determined whether or not the initialization processing completed.

Figure 7:
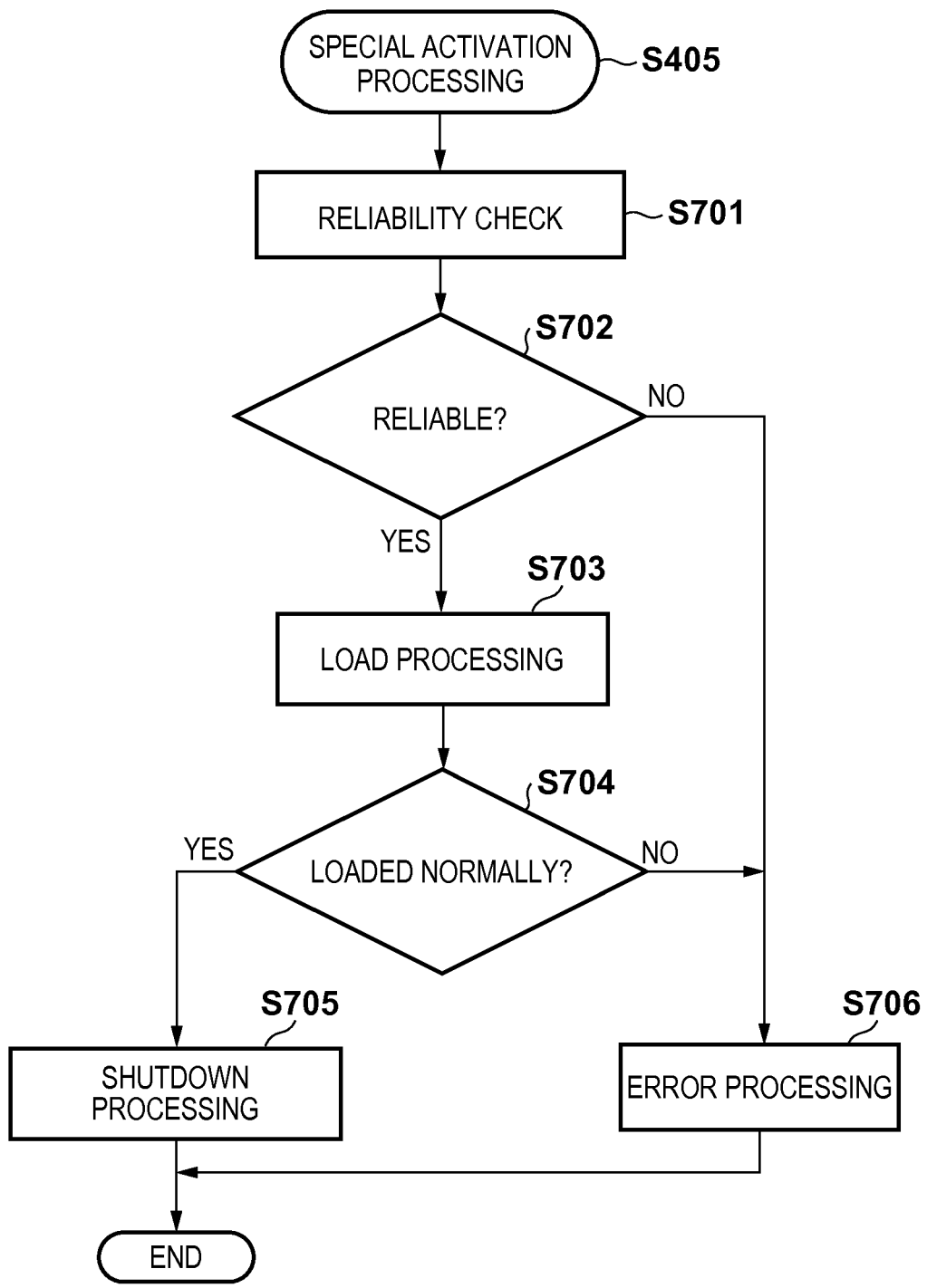
FIG. 7 is a flowchart for describing special activation processing (step S405 of FIG. 4) by the image forming apparatus according to the embodiment.

FIG. 7 is a flowchart for describing the special activation processing (step S405 of FIG. 4) by the image forming apparatus 1 according to the embodiment. Note, this processing is achieved by the CPU 101 executing the boot program stored in the ROM 116. Here, explanation will be given using an example of processing in a maintenance mode for restoring or updating data stored in the HDD 102 as the special activation processing.

When, in step S404, it is determined that the activation is not the remote activation request after it is determined in step S402 of FIG. 4 that there is a special activation request as, for example, insertion of USB memory has been detected, processing proceeds to the special activation processing of step S405. Firstly, in step S701, the CPU 101 checks the reliability of the operating system and firmware of the inserted USB memory. An example of this reliability check (consistency check) is a method in which the CPU 101 references a digital certificate within the USB memory and confirms through a certification authority that there are no maliciously altered files.

In step S702, when the CPU 101 determines that the files can be trusted, the processing proceeds to step S703 and the CPU 101 loads the operating system and firmware into the RAM 103. Next, the CPU 101, based on the firmware loaded into the RAM 103 or on a setting file stored in a file system of the USB memory, overwrites the operating system, firmware and file system of the HDD 102. After the overwriting completes, the processing proceeds to step S704 and the CPU 101 determines whether or not the overwriting processing finished normally. In one example of this determination processing, a hash value is calculated for the files overwritten onto the HDD 102, and the determination is made based on whether or not this value matches a normal hash value of the USB memory. When it is determined that the overwriting completed normally, the processing proceeds to step S705, the CPU 101 initiates shutdown processing and this processing completes.

Meanwhile, when the CPU 101, in step S702, detects that the files cannot be trusted, or, in step S704, that the overwriting did not complete normally, the processing proceeds to step S706 and the CPU 101 displays an error message on the display unit 108 of the control panel 5 and enters a standby state.

By the above described embodiment, upon receiving the remote activation request via the network, transition into the special activation processing is not performed. Because of this, for example, there is an effect that a case in which a transition into a state that the user does not desire, upon receiving the remote activation request, due to a USB memory designating a maintenance mode being left mounted, can be prevented.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-249646, filed Nov. 13, 2012, which is hereby incorporated by reference herein in its entirety.

What is claimed is:

1. An information processing apparatus operable to activate in either a normal activation mode or in a special activation mode for updating data stored in a memory, the apparatus comprising:
   a reception unit configured to receive a packet transmitted from an external apparatus on a network;
   a first operation unit configured to accept from a user a special operation for causing the information processing apparatus to activate in the special activation mode; and
   a control unit configured to cause the information processing apparatus to activate in the normal activation mode in response to the reception unit receiving an activation a magic packet for causing the information processing apparatus to activate,
   wherein the control unit causes the information processing apparatus to activate in the normal activation mode rather than in the special activation mode in response to the reception unit receiving the activation packet even if the first operation unit accepts the special operation, and
   wherein the special operation is a pressing of a predetermined key.

2. The information processing apparatus according to claim 1, further comprising:
   a second operation unit configured to accept from a user an activation operation for causing the information processing apparatus to activate,
   wherein the control unit causes the information processing apparatus to activate in the normal activation mode if the second operation unit accepts the activation operation and the first operation unit does not accept the special operation, and
   wherein the control unit causes the information processing apparatus to activate in the special activation mode if the second operation unit accepts the activation operation and the first operation unit accepts the special operation.

3. The information processing apparatus according to claim 1, wherein the memory is an HDD (hard disk drive).

4. The information processing apparatus according to claim 1, wherein the information processing apparatus is a printing apparatus configured to execute print processing.

5. An information processing apparatus operable to activate in either a normal activation mode or in a special activation mode for updating data stored in a memory, the apparatus comprising:
   a reception unit configured to receive a packet transmitted from an external apparatus on a network;
   a first operation unit configured to accept from a user a special operation for causing the information processing apparatus to activate in the special activation mode;
   a second operation unit configured to accept from a user an activation operation for causing the information processing apparatus to activate; and
   a control unit configured to:
   (i) if the reception unit receives a magic packet for causing the information processing apparatus to activate, uniformly cause the information processing apparatus to activate in the normal activation mode irrespective of whether or not the first operation unit accepts the special operation, and
   (ii) if the second operation unit accepts the activation operation, cause the information processing apparatus to activate selecting either the normal activation mode or the special activation mode based on whether or not the first operation unit accepts the special operation, and
   wherein the special operation is a pressing of a predetermined key.

6. The information processing apparatus according to claim 5, wherein the control unit causes the information processing apparatus to activate in the normal activation mode if the second operation unit accepts the activation operation and the first operation unit does not accept the special operation, and wherein the control unit causes the information processing apparatus to activate in the special activation mode if the second operation unit accepts the activation operation and the first operation unit accepts the special operation.

7. The information processing apparatus according to claim 5, wherein the memory is an HDD.

8. The information processing apparatus according to claim 5, wherein the information processing apparatus is a printing apparatus configured to execute print processing.

9. A method of controlling an information processing apparatus operable to activate in either a normal activation mode or in a special activation mode for updating data stored in a memory, the method comprising:

receiving a packet transmitted from an external apparatus on a network;

accepting from a user a special operation for causing the information processing apparatus to activate in the special activation mode; and causing the information processing apparatus to activate in the normal activation mode in response to a reception of a magic packet for causing the information processing apparatus to activate, wherein the causing step causes the information processing apparatus to activate in the normal activation mode rather than in the special activation mode in response to the reception of the activation packet even if the special operation is accepted from the user, and wherein the special operation is a pressing of a predetermined key.

10. A non-transitory computer-readable storage medium storing a computer program for causing a computer to execute a method of controlling an information processing apparatus operable to activate in either a normal activation mode or in a special activation mode for updating data stored in a memory, the method comprising:

receiving a packet transmitted from an external apparatus on a network;

accepting from a user a special operation for causing the information processing apparatus to activate in the special activation mode; and causing the information processing apparatus to activate in the normal activation mode in response to a reception of a magic packet for causing the information processing apparatus to activate, wherein the causing step causes the information processing apparatus to activate in the normal activation mode rather than in the special activation mode in response to the reception of the activation packet even if the special operation is accepted from the user, and wherein the special operation is a pressing of a predetermined key.

11. A method of controlling an information processing apparatus operable to activate in either a normal activation mode or in a special activation mode for updating data stored in a memory, the method comprising:

receiving a packet transmitted from an external apparatus on a network;

accepting from a user a special operation for causing the information processing apparatus to activate in the special activation mode;

accepting from a user an activation operation for causing the information processing apparatus to activate;

if a magic packet for causing the information processing apparatus to activate is received, uniformly causing the information processing apparatus to activate in the normal activation mode irrespective of whether the special operation is accepted or not, and if the activation operation is received, causing the information processing apparatus to activate selecting either the normal activation mode or the special activation mode based on whether the special operation is accepted or not, wherein the special operation is a pressing of a predetermined key.

12. A non-transitory computer-readable storage medium storing a computer program for causing a computer to execute a method of controlling an information processing apparatus operable to activate in either a normal activation mode or in a special activation mode for updating data stored in a memory, the method comprising:

receiving a packet transmitted from an external apparatus on a network;

accepting from a user a special operation for causing the information processing apparatus to activate in the special activation mode;

accepting from a user an activation operation for causing the information processing apparatus to activate;

if a magic packet for causing the information processing apparatus to activate is received, uniformly causing the information processing apparatus to activate in the normal activation mode irrespective of whether the special operation is accepted or not, and if the activation operation is received, causing the information processing apparatus to activate selecting either the normal activation mode or the special activation mode based on whether the special operation is accepted or not, wherein the special operation is a pressing of a predetermined key.

* * * * *